(12) United States Patent
Ziegler et al.

(10) Patent No.: US 8,273,238 B2
(45) Date of Patent: Sep. 25, 2012

(54) TOOL FOR THE ELECTROCHEMICAL MACHINING OF A FUEL INJECTION DEVICE

(75) Inventors: Christian Ziegler, Illingen (DE); Steffen Beetz, Homburg (DE); Rudolf Scherer, Breitenbach (DE); Stefan Moser, Remseck (DE)

(73) Assignee: Robert Bosch GmbH, Stuttgart (DE)

( * ) Notice: Subject to any disclaimer, the term of this patent is extended or adjusted under 35 U.S.C. 154(b) by 1161 days.

(21) Appl. No.: 11/917,296

(22) PCT Filed: May 8, 2006

(86) PCT No.: PCT/EP2006/062128
§ 371 (c)(1),
(2), (4) Date: Apr. 21, 2008

(87) PCT Pub. No.: WO2006/134004
PCT Pub. Date: Dec. 21, 2006

(65) Prior Publication Data
US 2008/0197215 A1  Aug. 21, 2008

(30) Foreign Application Priority Data
Jun. 16, 2005  (DE) .......................... 10 2005 027 844

(51) Int. Cl.
*B23H 3/00* (2006.01)
*F02M 59/00* (2006.01)
*C25D 17/00* (2006.01)

(52) U.S. Cl. ............... 205/640; 239/533.2; 204/194
(58) Field of Classification Search .............. 205/640; 239/533.2; 204/194
See application file for complete search history.

(56) References Cited

U.S. PATENT DOCUMENTS

| 4,578,164 | A | * | 3/1986 | Matsui et al. ............ 205/670 |
| 5,026,462 | A |   | 6/1991 | Butterfield et al. |
| 5,715,788 | A | * | 2/1998 | Tarr et al. ............ 123/297 |
| 6,110,350 | A |   | 8/2000 | Wei et al. |
| 2007/0116583 | A1 | | 5/2007 | Aoki |

FOREIGN PATENT DOCUMENTS

| DE | 3531761 A1 | 3/1987 |
| EP | 0 446 165 A1 | 9/1991 |

* cited by examiner

*Primary Examiner* — Lore Jarrett
(74) *Attorney, Agent, or Firm* — Michael Best & Friedrich LLP

(57) ABSTRACT

The invention relates to a tool for the electrochemical machining of a fuel injection device, the tool having an electrode holder and an electrode element which forms a cathode during the machining operation in order to be able to electrochemically remove material from the fuel injection device in a machining region. The electrode element is arranged in such a way that it can be displaced in relation to the electrode holder.

20 Claims, 4 Drawing Sheets

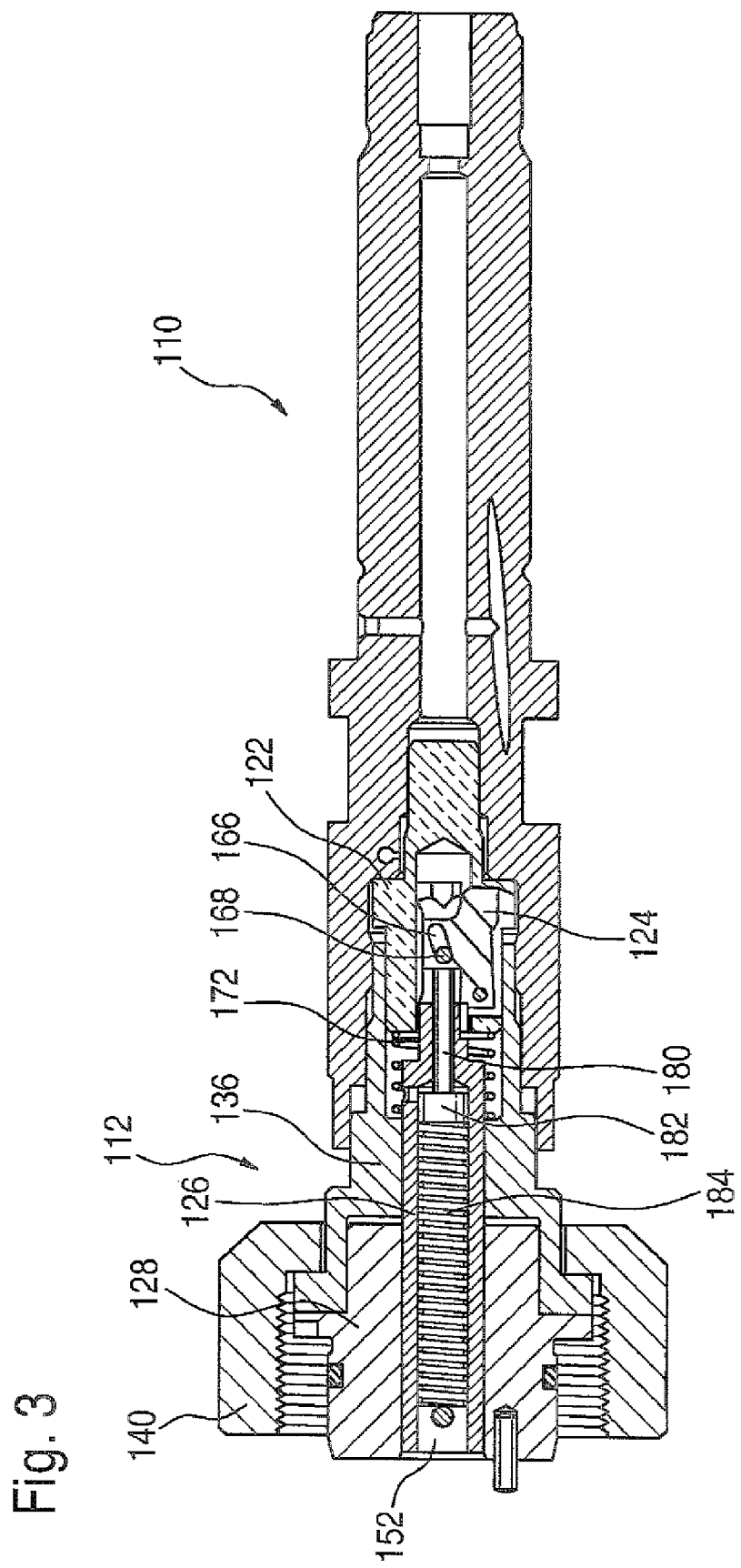

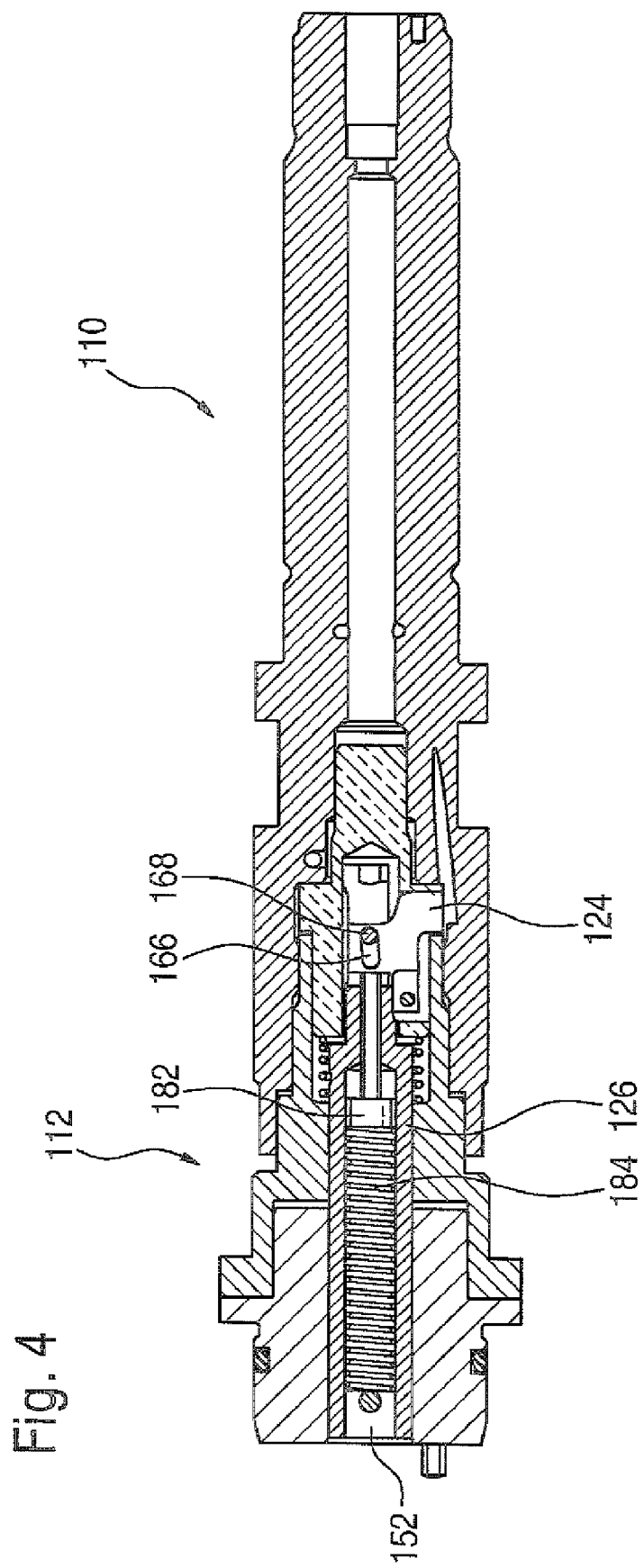

TOOL FOR THE ELECTROCHEMICAL MACHINING OF A FUEL INJECTION DEVICE

CROSS-REFERENCE TO RELATED APPLICATION

This application is a 35 USC 371 application of PCT/EP 2006/062128 filed on May 8, 2006.

BACKGROUND OF THE INVENTION

1. Field of the Invention

The invention relates to an improved tool for electrochemical machining of a fuel injection device.

2. Description of the Prior Art

Fuel injection devices are components of fuel injection systems. With these systems, fuel can be delivered from a tank to the combustion chambers of an internal combustion engine. Pumps, in particular high-pressure pumps, can be used, which subject the fuel to pressure and deliver it to the fuel injection devices. The fuel injection devices typically have a housing in which a plurality of chambers are provided for carrying and/or holding fuel. Between these chambers, sharp-edged transition regions may be embodied, especially whenever the individual chambers are made by metal-cutting machining. In the regions of the sharp-edged transitions, burrs can be formed, which have to be removed before the fuel injection device is put into operation.

In addition to mechanical methods, the possibility exists of removing these burrs by way of electrochemical machining. Such a method provides that an electrode, connected as a cathode, is brought to a machining region of a fuel injection device that is to be deburred, the latter being connected as an anode. An electrolyte fluid can be delivered to the machining region, and as a result, electrochemical reactions take place at the electrode connected as a cathode and at the workpiece connected as an anode. At the anode, positively charged cations are removed, which together with hydroxide ions react to form a metal hydroxide and settle out as sludge. At the cathode, various chemical reduction reactions take place.

The method described is quite suitable for enabling a defined quantity of material to be removed from the housing of a fuel injection device. However, especially in undercut regions of the housing, it can be difficult to position the electrode in the fuel injection device in such a way that an optimal work gap is formed between the electrode and the work region.

With this as the point of departure, the object of the present invention is to further develop a tool for electrochemical machining of a fuel injection device such that deburring, with good material removal rates, is made possible even in undercut regions of the fuel injection device.

SUMMARY AND ADVANTAGES OF THE INVENTION

Because the electrode element is disposed movably relative to the electrode holder, the electrode element can be moved independently of the electrode holder. Thus the electrode holder can be introduced into the fuel injection device, and the electrode element can be adjusted independently of the electrode holder in its position relative to the machining region, for instance with the aid of an actuating element. Thus via the actuating element, the width in particular of the work gap between the electrode element and the machining region can be adjusted. Thus even machining regions that are very difficult to access can be machined with high material removal rates. Because of the good removal of material, it is also attained that work steps beforehand and afterward that must sometimes be done manually can be omitted. This contributes to making the fuel injection device capable of being produced in great numbers with high quality.

BRIEF DESCRIPTION OF THE DRAWINGS

Especially preferred exemplary embodiments of the present invention will be described in further detail below in conjunction with the accompanying drawings, in which:

FIG. 3 is a sectional view of a tool in a second embodiment of the invention, in which an electrode element occupies a first position; and FIG. 4 is a view corresponding to FIG. 3, in which the electrode element occupies a second position.

DESCRIPTION OF THE PREFERRED EMBODIMENTS

Figure 1:
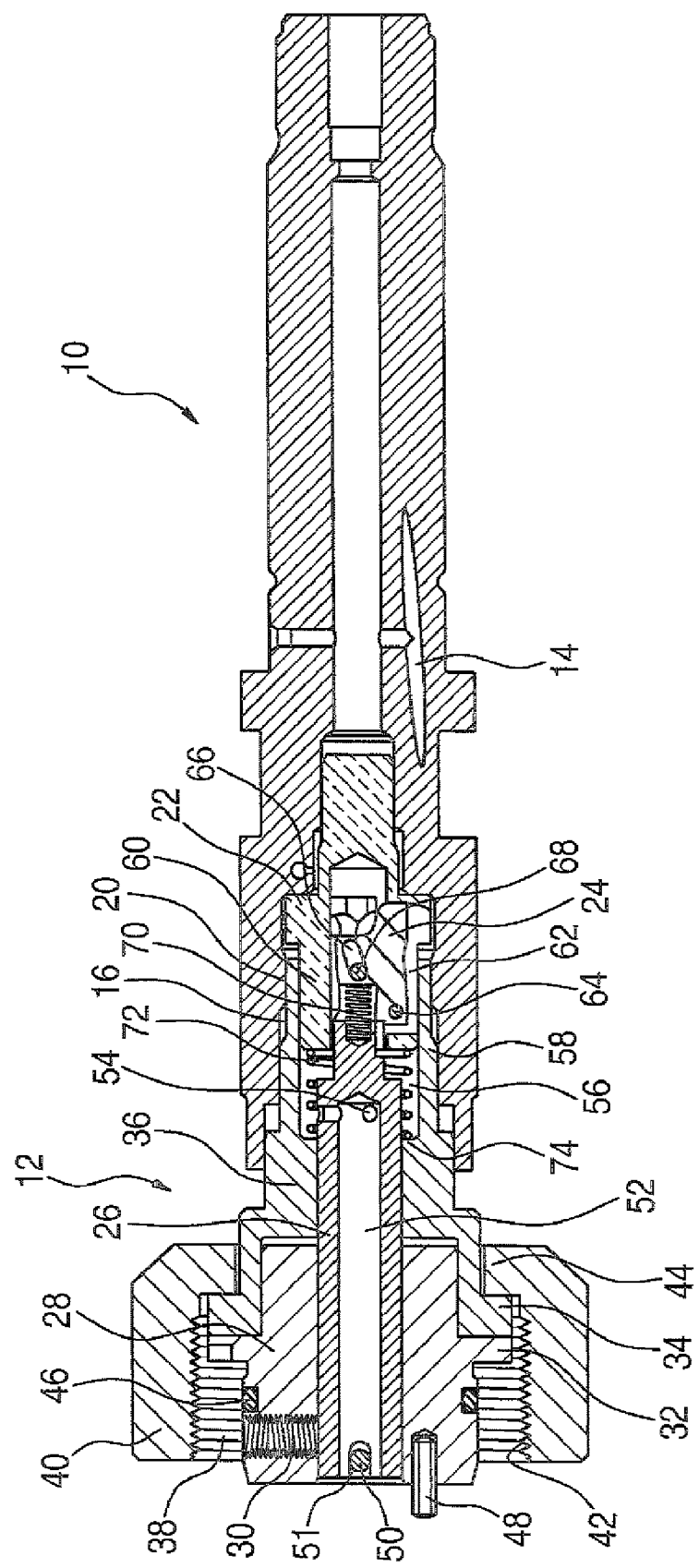
FIG. 1 is a sectional view of a tool in a first embodiment of the invention, in which an electrode element occupies a first position.

In FIG. 1, the housing of a fuel injection device is identified by reference numeral 10, and a tool for machining the injection device is identified by reference numeral 12.

Figure 2:
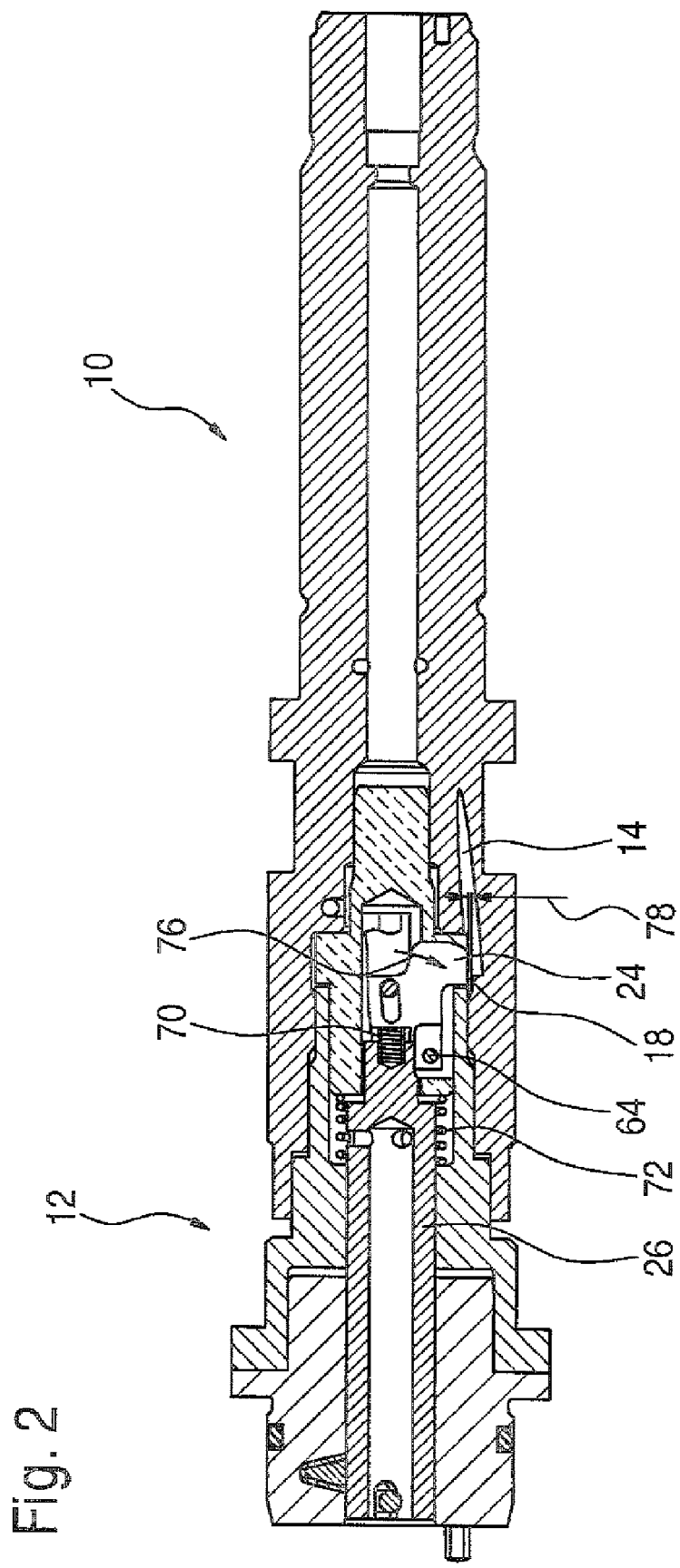
FIG. 2 shows a view corresponding to FIG. 1, in which the electrode element occupies a second position.

In the injection device 10, a bore 14 is provided, which is shown in different portions in the sectional planes selected in FIGS. 1 and 2. The bore 14 discharges into a substantially rotationally symmetrical chamber 16, in which the tool 12 is partially received. The and bore 14 and chamber 16 adjoin one another and there form a machining region 18, from which burr material is to be removed with the aid of the tool 12.

The machining region 18 is provided adjacent to a protrusion 20, which extends into the chamber 16, so that from the standpoint of the tool 12, the machining region 18 is located in an undercut region and is therefore poorly accessible.

The tool 12 has an electrode holder 22 of electrically insulating material, which is received entirely in the chamber 16 in the injection device 10; an electrode element 24, which is supported pivotably on the electrode holder 22; and an actuating element 26, which is embodied in elongated form and protrudes out of the chamber 16 in the injection device 10.

The actuating element 26 is embodied substantially cylindrically and is supported displaceably in a receiving element 28. With the aid of a locking screw 30 that is supported in the receiving element 28 and extends radially to the actuating element 26, the actuating element can be fixed in a defined position inside the receiving element 28.

The receiving element 28 has a radially outward-pointing protrusion 32, which adjoins a collar 34 that is embodied on a guide element 36. The actuating element 26 is guided in the guide element 36. The protrusion 32 of the receiving element 28 and the collar 34 of the guide element 36 are received in an inner chamber 38 in a clamping element 40. The clamping element 40 defines the inner chamber 38 with a female threaded surface 42. Via a head 44 that engages the collar 34 of the guide element 36 from behind, the clamping element 40 and thus the receiving element 28 as well as the guide element 36 can be firmly clamped on a machine, not shown, so that the tool 12 can be supplied with electrical energy and with electrolyte fluid. The inner chamber 38 in the clamping element 40 is sealed off from the machine, not shown, with the aid of a seal 46. The receiving element 28, on its end remote from the injection device 10, has a pin 48 with which the radial position of the tool 12 relative to the machine is defined.

The receiving element 28 moreover, on its end remote from the injection device, has a guide pin 50, which engages a groove 51 in the actuating element 26, so that the rotary position of the actuating element 26 relative to the receiving element 28 is defined.

In its interior, the actuating element 26 has a line 52, which on the end toward the injection device 10 discharges at a bore 54. The bore 54 leads to a fluid chamber 56, which is defined by a sleeve 58 that is embodied in one piece with the guide element 36.

The electrode holder 22 plunges with a wall portion 60 into the sleeve 58, and with this wall portion 60, it defines an electrode chamber 62.

The electrode holder 22 has a bolt 64 on which the electrode element 24 is pivotably supported. The electrode element 24 moreover has a slot 66, in which a sliding-block pin 68 is received that is part of the actuating element 26.

A contact spring 70 is disposed between the actuating element 26 and the electrode element 24. This spring is anchored firmly by one end in the material comprising the actuating element 26, and with its other end it presses against the electrode element 24, so that by way of the contact spring 70, an electrical connection is made between the actuating element and the electrode element 24.

Adjacent to the electrode holder 22, a compression spring 72 is provided, which is braced by one end on the end face of the wall portion 60 of the electrode holder 22. On its other end, the compression spring 72 is braced on a shoulder 74 that is embodied in the guide element 36.

In FIG. 1, the electrode element 24 is shown in its retracted position. To put the electrode element 24 in the projected position shown in FIG. 2, the receiving element 28 and the clamping element 40 are moved, via a drive mechanism not shown, in the direction of the injection device 10. As a result of the connection between the receiving element 28 and the actuating element 26, the actuating element 26 is moved into the electrode chamber 62, counter to the action of the compression spring 72. In the process, the sliding-block pin 68 slides inside the slot of the electrode element 24, so that the electrode element 24 is pivoted, in the pivoting direction marked 76, in the direction toward the machining region 18. Thus a work gap 78 between the electrode element 24 and the machining region 18 can be optimally adjusted.

In the position of the electrode element 24 shown in FIG. 2, the contact spring 70 is compressed compared to the position of the electrode element 24 shown in FIG. 1. Thus in any position of the electrode element 24, it can assure the electrical contacting between the actuating element 26 and the electrode element 24.

The embodiment of the invention shown in FIGS. 3 and 4 differs from the embodiment shown in FIGS. 1 and 2 in the embodiment of the electrical contacting of the electrode element. In FIG. 3, an injection device 110 is provided into which a tool 112 plunges in some portions. The tool 112 is equivalent in its essential construction to that of the tool 12 of FIGS. 1 and 2. The tool 112 likewise has an electrode holder 122, an electrode element 124, and an actuating element 126. The actuating element 126 is received in a receiving element 128, guided in a guide element 136 and can be fastened with the aid of a clamping element 140 on a machine, not shown. The actuating element 126, on its end toward the electrode element 124, has a displaceably supported bolt element 180, which is in contact with the electrode element 124. The bolt element 180, on its end remote from the electrode element 124, has a bolt head 182, which is subjected to pressure by a spring 184 in order to press the bolt element 180 against the electrode element 124 for the sake of electrical contacting.

In FIG. 3, the tool 112 is shown in the retracted state of the electrode element 124. As the tool 112 is moved into the injection device 110, a spring 172 is compressed. The actuating element 126 with its sliding-block pin 168 is moved into the injection device, so that the electrode element reaches its projected position (see FIG. 4). In the position of the electrode element 124 shown in FIG. 4, the bolt element 180 has been shifted by some distance from the position shown in FIG. 3, and as a result the spring 184 is compressed. The spring 184 assures the electrical contacting of the electrode element 124 in every position of the electrode element.

The foregoing relates to a preferred exemplary embodiment of the invention, it being understood that other variants and embodiments thereof are possible within the spirit and scope of the invention, the latter being defined by the appended claims.

The invention claimed is:

1. A tool for electrochemical machining of a fuel injection device, the tool comprising:
    an electrode holder and an electrode element, which during the machining of the fuel injection device the electrode element forms a cathode thereby enabling electrochemical removal of material in a machining region of the fuel injection device which forms an anode,
    wherein the electrode element is disposed movably relative to the electrode holder and is supported pivotably on the electrode holder;
    an actuating element which varies the position of the electrode element relative to the machining region; and
    a spring pressing the electrode holder and the actuating element at least indirectly toward one another.

2. The tool as defined by claim 1, wherein the actuating element is embodied for carrying electrolyte fluid.

3. The tool as defined by claim 1, wherein the electrode holder is formed of an electrically insulating material or is coated with such a material.

4. The tool as defined by claim 1, further comprising a further spring braced between the actuating element and the electrode element, the further spring providing the electrical contact for the electrode element.

5. The tool as defined by claim 1, further comprising a spring-loaded bolt element, displaceably supported in the actuating element, the spring-loaded bolt element providing electrical contact for the electrode element.

6. The tool as defined by claim 1, further comprising a receiving element which can be coupled to a machine that furnishes an electrical connection and/or electrolyte fluid for the tool, the actuating element being received displaceably and/or rotatably in the receiving element.

7. The tool as defined by claim 6, further comprising a fixing element which adjusts and/or fixes the position of the actuating element in the receiving element.

8. The tool as defined by claim 7, further comprising a fixing element which adjusts and/or fixes the position of the receiving element in the machine.

9. The tool as defined by claim 6, further comprising a fixing element which adjusts and/or fixes the position of the receiving element in the machine.

10. A tool for electrochemical machining of a fuel injection device, the tool comprising:
    an electrode holder and an electrode element, which during the machining of the fuel injection device the electrode element forms a cathode thereby enabling electrochemical removal of material in a machining region of the fuel injection device which forms an anode, wherein the electrode element is disposed movably relative to the electrode holder and is supported pivotably on the electrode holder;

an actuating element which varies the position of the electrode element relative to the machining region;

a spring pressing the electrode holder and the actuating element at least indirectly toward one another; and a sliding block received in a guide region, which connects the actuating element and the electrode element with one another.

11. The tool as defined by claim 10, further comprising a further spring braced between the actuating element and the electrode element, the further spring providing the electrical contact for the electrode element.

12. The tool as defined by claim 10, wherein the actuating element is embodied for carrying electrolyte fluid.

13. The tool as defined by claim 10, wherein the electrode holder is formed of an electrically insulating material or is coated with such a material.

14. The tool as defined by claim 10, further comprising a spring-loaded bolt element, displaceably supported in the actuating element, the spring-loaded bolt element providing electrical contact for the electrode element.

15. The tool as defined by claim 10, further comprising a receiving element which can be coupled to a machine that furnishes an electrical connection and/or electrolyte fluid for the tool, the actuating element being received displaceably and/or rotatably in the receiving means element.

16. The tool as defined by claim 15, further comprising a fixing element which adjusts and/or fixes the position of the actuating element in the receiving element.

17. The tool as defined by claim 16, further comprising a fixing element which adjusts and/or fixes the position of the receiving element in the machine.

18. The tool as defined by claim 15, further comprising a fixing element which adjusts and/or fixes the position of the receiving element in the machine.

19. A fuel injection device having:

a housing and at least two chambers embodied in the housing for receiving and/or carrying fuel, the chambers adjoining one another and forming a sharp-edged machining region which has been deburred with a tool; said tool comprising an electrode holder and an electrode element, which during the machining of the fuel injection device the electrode element forms a cathode thereby enabling electrochemical removal of material in a machining region of the fuel injection device which forms an anode and the electrode element is disposed movably relative to the electrode holder and is supported pivotably on the electrode holder, an actuating element which varies the position of the electrode element relative to the machining region, and a spring pressing the electrode holder and the actuating element at least indirectly toward one another.

20. A method for producing a fuel injection device, having a housing and having at least two chambers, embodied in the housing, for receiving and/or carrying fuel, the chambers adjoining one another and forming a sharp-edged machining region, the method comprising:

deburring the machining region with a tool;

said tool comprising an electrode holder and an electrode element, which during the machining of the fuel injection device the electrode element forms a cathode thereby enabling electrochemical removal of material in a machining region of the fuel injection device which forms an anode and the electrode element is disposed movably relative to the electrode holder and is supported pivotably on the electrode holder, an actuating element which varies the position of the electrode element relative to the machining region, and a spring pressing the electrode holder and the actuating element at least indirectly toward one another.

* * * * *